Nov. 3, 1964                C. A. ELWELL                 3,154,881
                            ANIMATED DOLL
Filed Dec. 28, 1960                              3 Sheets-Sheet 1
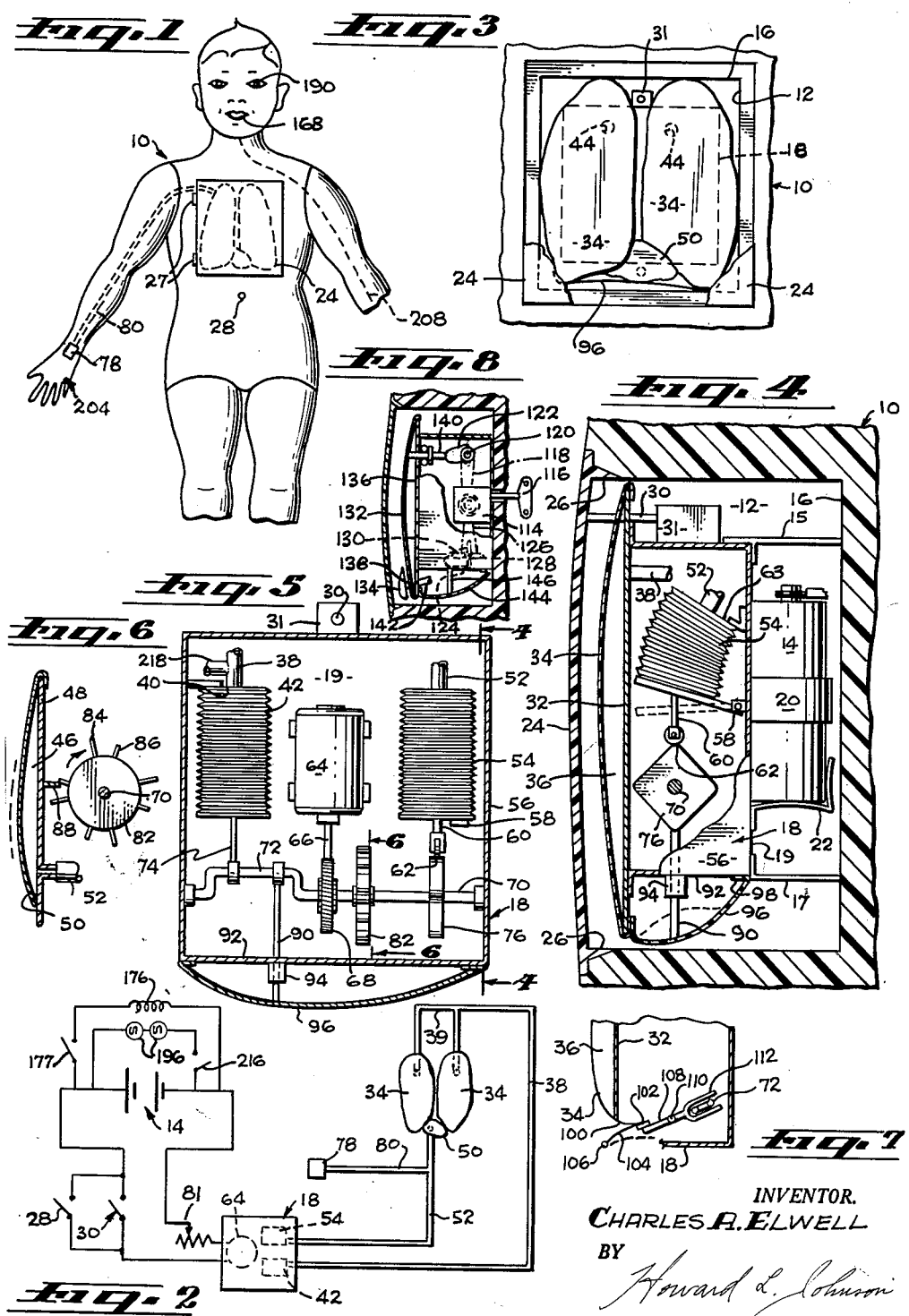
INVENTOR.
CHARLES A. ELWELL
BY
Howard L. Johnson
ATTORNEY

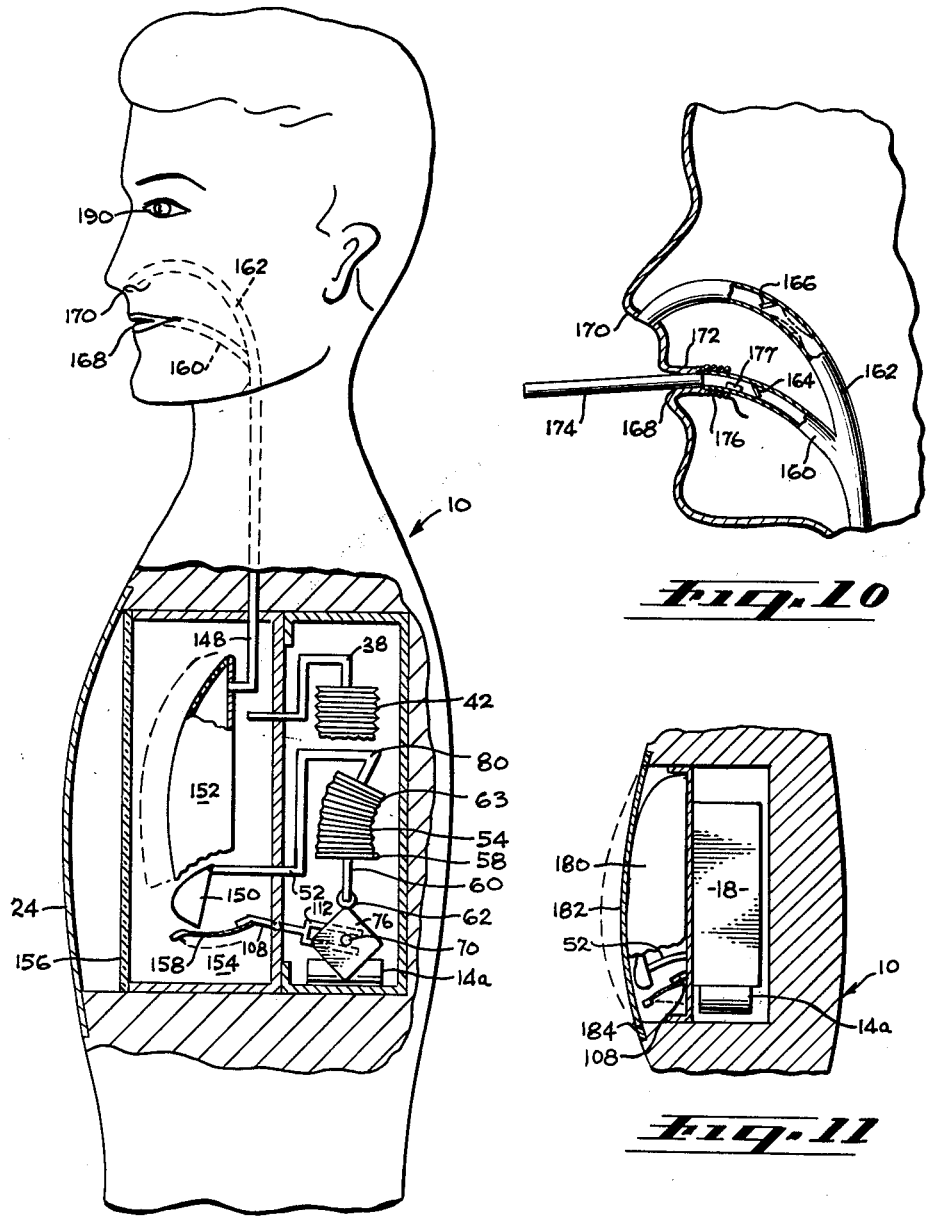

Nov. 3, 1964　　　　C. A. ELWELL　　　　3,154,881
ANIMATED DOLL
Filed Dec. 28, 1960　　　　　　　　　　　3 Sheets-Sheet 3
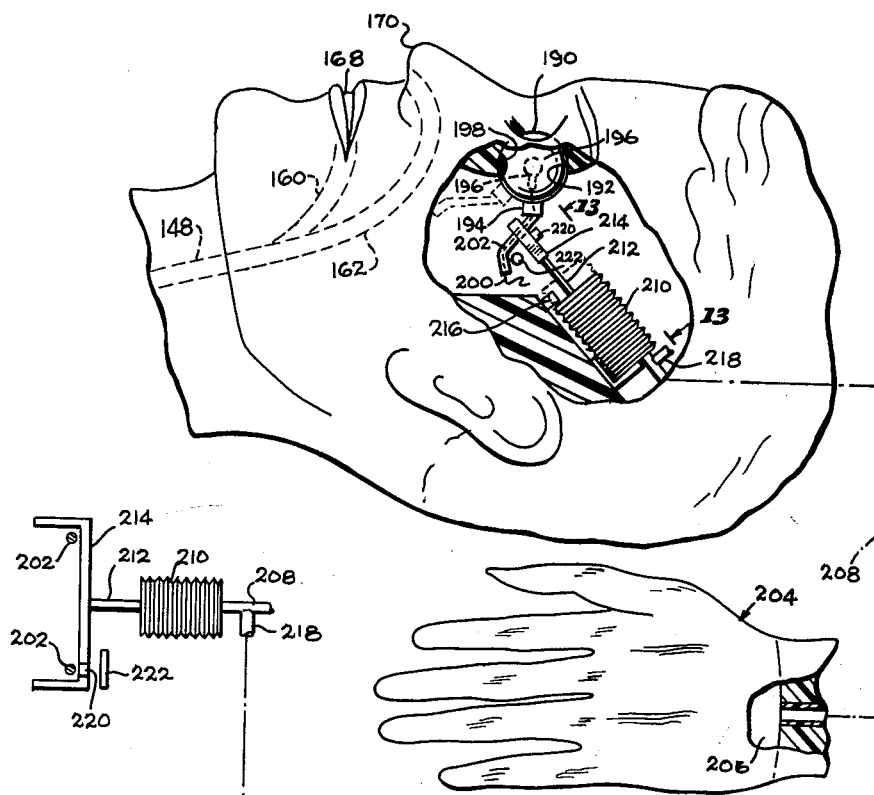
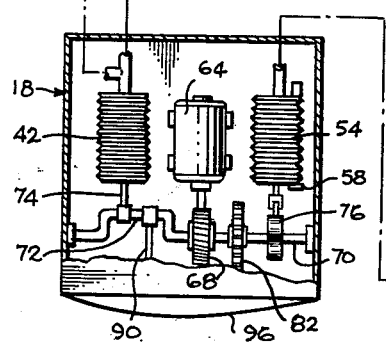
INVENTOR.
CHARLES A. ELWELL
BY
*Howard L. Johnson*
ATTORNEY

United States Patent Office 3,154,881
Patented Nov. 3, 1964

3,154,881
ANIMATED DOLL
Charles A. Elwell, Los Angeles County, Calif., assignor to Product Design & Development Corporation, Beverly Hills, Calif., a corporation of Nevada
Filed Dec. 28, 1960, Ser. No. 79,004
4 Claims. (Cl. 46—9)

This invention relates to mechanism simulating the natural and interrelated timing or physiological rhythm of certain living organs, and to anatomical models or simulacrums containing such mechanism. Thus the correlated rhythm of mammalian respiration and circulation is imitated audibly and/or visibly. Such manifestation may be produced, for example, in a doll, manikin or other model for either amusement or demonstration purposes. The combination of entertainment and education may be achieved in a child's toy. Accordingly one embodiment provides a doll having a self-contained power source and correlated mechanism for producing audible respiratory sounds and heart beats, plus visible pulsations of heart and arteries and expansion-contraction of lungs and diaphragm, corresponding to the natural timing of these several parts in a living body.

Thus an important object is to provide a "living" doll, upon which a child can feel and count the pulse beats at a point such as the wrist, can listen to the heart beats by holding her ear to the body or alternately by using a stethoscope, and (usually by removing a chest plate) can watch the lungs and diaphragm expand and contact in synchronization with the visible pulsations of the heart and arteries.

Another purpose is the provision of such a self-contained unit or mechanism which can be simply or interchangeably mounted in various manikin bodies or simulacrums, which latter may also embody additional features which it is desired to exhibit in association therewith.

A further object is to provide a handable doll or the like having operative means including a self-contained (electric) power source adapted to operate a plurality of simulated and interrelated physiological functions such as circulation, respiration and consciousness (the latter evidenced, for example, by the eyes opening and lighting up). Thus, one such feature arises from means whereby the child can cause the reclining doll to "waken"—as evidenced by the closed eyes being opened—in response to the child pressing the doll's hand. Likewise, the doll may be caused to wink, when the eyes are normally open.

Yet another purpose is the provision of such a unit or model provided with an outswinging or removable chest plate, coupled to automatic switch means for starting such internal mechanism upon opening of the plate, and stopping the mechanism upon its replacement. Preferably the doll is also provided with an alternate switch, responsive only to continuous pressure, so that a child while depressing the switch can observe so much of the effects as are apparent without disturbing the chest plate (which may be transparent), but which switch automatically shuts off the mechanism as soon as the child's attention is distracted and her pressure on the switch is thus released.

In particular embodiments, pulsations of the operatively connected heat-arteries and the lungs are produced respectively by means of separate, flexible, fluid-filled containers, typically bellows-operated air chambers. Alternately, pulsations of a more-or-less surrounding fluid chamber may be contact-transmitted to a sealed chamber representing heart or lungs which thus "beat" at the desired rates. In still another embodiment, a piston-operated flexible surface is employed without a fluid chamber to simulate pulsations of the respective circulatory or respiratory systems. Alternate to the self-contained power source such as a dry cell or capsule of radioactive material, a clock-type mechanism may be provided for spring wind or other manual operation; or if desired, an electric motor can be incorporated to be plugged in to any convenient source of electrical current in the home or exhibit room.

The present mechanical features are advantageously associated with a model which shows internal skeletal structure, such as the ribs and sternum—that is, the cage elements of the pleural cavity, the areas of ossification either being painted or otherwise marked upon the external surface of the model, or else being embedded in or embossed upon an inner surface and externally visible through a transparent structure such as the removable chest plate. Also, for use as an education model the present doll may be packaged together with such instruments as an anesthetic mask, a stethoscope with which to listen to the heart beat and respiratory sound (including coughing) and/or a watch (or hour glass) for timing the pulse. A fever thermometer can also be included, for use with a model provided with a corresponding aperture or socket (located in the mouth or armpit) provided with a heating element such as high resistance wire, so that the child can take the temperature of the "patient." Conventional mechanisms and structures can also be included in a doll or mannikin, such as those for walking or other movement, for talking (by means of recordings), for intake and elimination of liquids etc., as well as removable abdominal organs and other parts.

In one embodiment, the doll or model actually inhales and exhales external air with each respiratory cycle, and in conjunction with such mechanism, it can simultaneously smoke a cigarette (or other smoke-producing article), the smoke being inhaled through the mouth and visibly exhaled through the nose. In fact, by using a white or light-colored lung chamber (of latex for example), the child or other observer can actually see how the continuous tobacco smoke progressively darkens the "lungs" by cumulative deposition of tars and the like. Corresponding darkening need not occur at the same time in the pulsated heart cavity since the latter has a separate (closed) circulation, although actuated by the same motor or mechanism. Means are also provided for producing a coughing sound upon each exhalation.

By another modification, the hinged or removable chest plate may take the form of a flexible, transparent layer or shield which frictionally overlies the pulsating chest cavity so as to oscillate simultaneously therewith and thus make the respiratory or chest movement externally visible without requiring removal or opening of any structure. If desired, the eyes may also open and close with each respiration.

Other advantages and purposes of the invention will be apparent as the description proceeds, particular reference being had to the illustrated, presently preferred embodiments which demonstrate the operation thereof as shown in the accompanying drawings wherein FIGURE 1 is a front elevational view of a doll, with a unit containing my pulsation mechanism shown mounted in the chest area and connected to a wrist chamber for there observing the pulse;

FIGURE 2 is a diagrammatic representation of the fluid lines and electrical connections of the activating mechanism;

FIGURE 3 is a top plan view of a container housing the activating mechanism in a chest cavity, most of the cover of the cavity being broken away;

FIGURE 4 is a longitudinal sectional view along line

4—4 of FIGURE 5 taken through the mounted housing with some of the internal elements seen in elevation;

FIGURE 5 is a top plan view of the mechanism within the housing, with the inflation membranes removed;

FIGURE 6 is a sectional view taken along the line 6—6 of FIGURE 5 particularly showing the heart chamber and, in elevation, the rotary mechanism which produces the heart sounds;

FIGURE 7 is a side elevational view of an alternate form of linkage for oscillating the diaphragm;

FIGURE 8 is a longitudinal sectional view thru the mounted housing similar to FIGURE 4 but showing a modified form of mechanism for operating the heart, lungs and diaphragm, in response to a spring motor, these several organs being represented alone by flexible surfaces without inflation chambers;

FIGURE 9 is a side elevational view of the head and upper torso of a doll with a portion of the latter broken away to show (mostly in elevation) a modified form of arrangement for pulsating the heart, diaphragm and lungs, with the latter open to external air thru a line to the mouth and nose, whereby the doll is able to smoke a cigarette;

FIGURE 10 is a vertical sectional view thru the front of the head, particularly showing the valves in the air lines to the mouth and nose whereby the doll is able to inhale and exhale cigarette smoke, and a sound is emitted upon exhalation;

FIGURE 11 is a longitudinal sectional view thru the chest area showing an external chest surface which is attached to and pulsates with the lungs, the latter in this construction being operated without external air;

FIGURE 12 is a side elevational view of the head of a doll, partly broken away to show (in elevation) the inner mechanism for (alternately) opening both eyes or winking an eye, in response to compression of the doll's hand connected thereto by a fluid line (indicated diagrammatically), the eye action depending upon whether the doll is upright or lying down; and FIGURE 13 is a top plan view of some of the mechanism of the head as viewed along the line 13—13 of FIGURE 12, shown connected diagrammatically to the lung bellows of the main operating unit located in the chest of the doll, whereby the doll's eyes can be opened and closed with each respiratory cycle.

It is contemplated that in most instances, my mechanism will be installed in a doll or manikin which represents a human (or animal), but it can also be employed by itself or with a minimum of surrounding housing as a demonstration model or simulacrum particularly to show the related rhythms or action of the heart, lungs, diaphragm, etc.

For purposes of description, the mechanism in whole or part will hereafter be referred to in relation to its use in a representation of a human figure such as a doll. Advantageously, its incorporation as a unit in existing doll or manikin bodies can be effected with a minimum of structural alteration of the latter, but such specific embodiment should not be regarded as a necessary limitation to its use. Likewise, various features here operated by unitary mechanism can if desired be employed separately.

Conveniently a more-or-less rectangular cavity 12 is provided in the chest area of the doll 10, of a capacity (depending upon the size of the doll) to receive both the present mechanism plus one or more power units such as dry cells 14 used to operate the same. Alternately, if the chest cavity is not large enough, the connected power source can be lodged in one or more other cavities of the body such as in a hollow arm or leg, or elsewhere in the torso.

Both for convenience of assembly and to promote the interchangeability or replacement of such operating unit, the several elements thereof are compactly grouped together for removable insertion as a unit into a box-like, fixed housing 16 which is formed in place in the doll or else has its preconnected walls inserted into the body cavity 12 and anchored thereto. Spaced within the larger housing 16 and supported by resilient bracket arms 15, 17 (FIG. 4) is an inner frame or container structure 18, to the back of the rear surface (19) of which, one or more dry cells 14 may be detachably secured as by spring clips 20, 22. The cavity or housing 16 is itself provided with a snap-on or press-fit type closure or cover plate 24 of more-or-less rectangular outline and curved in general conformity with the natural configuration of the chest of a child or adult as the case may be. The chest plate 24 is desirably transparent, and conveniently possesses a certain resiliency so that a slight additional bending thereof is required to press it into place; the consequent tension tending to return it to shape will retain it in place by reason of lateral engagement of an opposing pair of inward extending lips 26. Rather than being completely detachable, the chest plate may be hinged as at 27.

An outwardly projecting stud 30 is the trigger of a spring-loaded switch element 31 carried by the frame 18 in position terminally to be contacted by the under face of the cover plate when closed. Thus as the cover plate 24 is pressed upon the doll, the trigger 30 is held depressed in the "OFF" position; conversely the mechanism is automatically turned on or started operating as soon as the chest plate is lifted and the trigger released. Another spring-loaded switch 28 may also be provided, conveniently in the navel depression, so that the mechanism can be operated and observed without removing the cover plate; thus especially when using a stethoscope, the heart can be heard with the chest plate closed.

The front of the inserted housing 18 itself is closed by a more-or-less rigid backing surface 32 which extends outward along each edge of the housing beyond the periphery and has a flexible membrane 34 disposed over its outer face and secured thereto about its outer edge or margin, the membrane having a surface area appreciably greater than that of the backing 32, so as to define an inflatable chamber 36 therebetween. Access to the chamber is by an air line 38 joining the fixed or outlet end 40 of a bellows 42 with an aperture 44 in the backing member 32 of the chamber 36. The forward or exposed face of the membrane 34 is shaped and/or colored to represent a lung surface, both right and left halves of a mammalian lung being presented (FIG. 3) either upon a front membrane of the same inflatable chamber 36 or upon membranes of separate chambers coupled by a dual line 39 to the same bellows 42 for simultaneous inflation and deflation as represented diagrammatically in FIG. 2.

A similar fabricated chamber 46 is shaped, lined and colored to represent a heart (FIGS. 3 and 6) being disposed in the correct anatomical position along the lower margins and between the two halves of the lung. As with the lungs, a heart chamber is formed of a rigid or semirigid backing member 48 having its forward face loosely covered by a flexible membrane 50 secured about the periphery thereof, with the thus-formed chamber 46 supplied by an air line 52 from a second bellows 54. The heart bellows 54 has its oscillating end hingedly secured (58) adjacent a side wall 56 of the housing frame 18 with an axially projecting rod 60 extending therefrom and terminally supporting a free roller or cam follower 62. The opposite end 63 of the heart bellows is fixed at an angular position.

Secured to the floor or inner surface of the back wall 19 of the housing frame 18 is an electric motor 64 operatively connected to the dry cells 14 thru the switches 28 and 30; and by means of a drive shaft 66 and worm gear and pinion 68 the motor operates a transverse cam shaft 70 at a rotation of the desired speed such as 20 revolutions a minute. The lung bellows 42 has its movable end joined to a crank arm 72 of the shaft 70 by a piston arm 74 so that the lung cavity 36 is thus inflated and deflated four times a minute. It will be observed that the total or confined volume of air within the bellows 42 and lung cavity 36 remains the same, since it is a closed system, but back compression of the bellows forces the compressed fluid to inflate the lung cavity 36, thus causing the front surface 34 to expand outward. Likewise, when the bellows rod 74 is extended, the lung membrane 34 is sucked inward or collapses. Continuous alterations of these two phases by the timing or pumping mechanism result in very visually discernable "pulsation" of the flexed lung surface (or of the heart surface 50 as the case may be).

Desirably the exposed heart or lung surface (34, 50) is resilient so as to absorb folds or wrinkles therein when contracting, altho if it were merely flexible and the folds became evident upon each contraction, it would not affect its operability.

Also affixed to the operating shaft 70 is a four-sided cam 76 (FIGS. 4–5) against which the cam follower 62 is continuously pressed by the resilence or expansion force of the heart bellows 54. (If desired, the cam 76 and roller 62 can also be held together magnetically or by spring action.) Accordingly, for each complete rotation of the shaft 70 or attached cam 76, the heart chamber 46 will pulsate four times (in unison with the bellows 54). In other words, the heart "beats" four times (or 80 times a minute) for each inflation of the lungs, which is the approximate physiological ratio. Such heart pulsation is manifestly visible (upon opening the chest plate 24 if the latter is rigid). In order to make it visible with the plate closed, as well as tactilely measurable in a natural manner, there is provided a wrist chamber 78 also connected by an air line 80 to the heart bellows 54 so that its external elastic membrane pulses the same as does the heart; a child by feeling this pulsating membrane can count or measure the pulse of the doll similar to that of a live patient. If desired, a rheostat 81 can be included in the electric circuit so that the operator can vary the pulsation rate.

Synchronous mechanism is also provided for producing an audible manifestation of the heart action. For each natural contraction of the living heart there are two discernable valve sounds (i.e. of auricle and ventricle) of different intensity, or pitch, both of which are hereby reproduced. Fixedly mounted on the operating shaft 70 is a radially extending disk or annulus 82 carrying four radially projecting pairs of fingers (FIG. 6), the two members 84, 86 of each pair being of unequal length and each disposed in turn, upon rotation to contact the end of a relatively rigid stud 88 upstanding from the rear face of the heart backing surface 48. Each such contact of stud 88 and finger 84, 86 results in a visible shock wave extending over the entire "heart" and also produces an audible sound, the second or ventricle sound (longer finger) being of lower pitch than that of the auricle. The spacing around the sound wheel 82 is two units between the members (84, 86) of a pair, and three units between each pair, thus corresponding to the actual physiological timing. Of course, if more convenient, the sound-producing reed 88 can be mounted on the housing frame 18 or elsewhere, and its direct vibration of the heart structure dispensed with.

Correlated exhalation and inhalation movement of a structure simulating a living diaphragm, in synchronization with the moving lungs is provided by means of a piston rod 90 also carried by the crank arm 72 laterally to the lung bellows arm 74 and longitudinally reciprocable in unison therewith the further extremity being journalled in an upstanding wall 92 and adjacent outer collar 94 of the frame 18. The terminous of the rod is fastened to a generally vertically disposed (when the doll is reclining) sheet 96 of fabric or the like which extends down loosely from the lower edge or margin of the lung backing surface 32, with its opposite margin 98 attached to the outer face of the frame wall 92. Accordingly as the lungs "fill" with air by contraction of the bellows 42, downward movement of the diaphragm rod 90 (as viewed in FIGS. 4–5) moves the fabic 96 outward, that is toward the feet of the doll, so as to extend it to the full and take out the folds. Upon "exhalation" of the lungs or expansion of the connected bellows 42, the diaphragm rod 90 simultaneously retracts and the fabric layer 96 again collapses into folds. This action is of course apparent with the cover plate 24 open or removed but may also be viewed thru it when the latter is transparent, being particularly evident when the "diaphragm" is brightly colored.

A modified form of diaphragm and pulsating arm is shown in FIGURE 7. A transverse strip of flexible material 100 extends loosely from the lower margin of the lung surface 34 back to a movable cross rod 102, while spaced below (i.e. toward the feet of the doll) a similar cross strip of flexible sheet material 104 is held between the oscillatable cross rod 102 and a fixed cross member 106, the latter being disposed approximately parallel to and in the same plane as the bottom margin of the lung. The cross rod 102 is arcuately movable, being carried by one end of a lever or pulsating arm 108 which is pivoted at 110 within the housing 18 and has a bifurcate end 112 within the crank arm 72 is received. Accordingly, with each revolution of the cam shaft 70, the cross rod 102 raises and lowers the "diaphragm" 104 synchronously with the contraction and expansion of the lungs. In other words, as the forward face 34 of the lungs is inflated outward, both the flap 100 and the connected diaphragm 104 "expand" downward; as the lungs collapse, the flap 100 and diaphragm 104 moves upward in unison therewith.

In another modified embodiment of the invention illustrated in FIGURE 8, in place of an electric motor there is provided a spring driven motor of mechanism 114, conveniently manually wound by an externally projecting key 115, which motor by a chain drive 118 rotates a transverse drive shaft 120 carrying a cam 122. A lower, parallel drive shaft 124, also rotated by a chain drive 126, carries a four-pointed cam 128 (analogous to the square cam 76) and one single-finger cam 130. In place of air filled chambers for the lungs and heart, each is replaced by a flexible or resilient surface, 132 and 134 respectively, bowed outwardly from a rigid backing support 136, 138, each of which in turn is traversed by a spring-retractable plunger 140, 142, aligned for contact with the respective cam finger 122 or 128. Thus, as before, the heart pulsates four times for each expansion of the lungs, and the diaphragm 144 is synchronously moved by a piston rod 146 in response to the cam 130 carried by the lower drive shaft 124 as in the earlier model.

Still another modification of the inflation-deflation mechanism is illustrated in FIGURE 9. Both the heart 150 and lungs 152 are represented by air sacks or chambers, of which only the former is sealed with a fixed volume of gas therein, and the latter is open to the atmosphere by an air line 148 to the mouth and/or nose of the doll. Both chambers are located in the same closed case or housing 154 which is provided with a transparent cover 156 disposed immediately beneath the chest plate 24.

As before, a pair of bellows 42, 54 reciprocating in a 1 to 4 ratio, oscillate the air pressure in the closed housing 154 and in the heart chamber 150 respectively. The action of the heart cavity (or the flexible front surface thereof) is the same as previously described. However, each cycle of the lung bellows 42 by varying the air pressure within the closed chamber 154, causes external air to move in and out of the lung cavity 152 thru the line 148 (flexing the forward surface thereof beneath the transparent cover or window 156). The flexible diaphragm 158 within the closed chamber 154 may be moved by the piston 90 or the forked lever 108 as in the prior embodiments, in either event being activated from the drive shaft 70.

The external air line 148, in the head area, has one branch 160 to the mouth and another branch 162 to the nostril, each branch being provided with a one-way or flap valve 164, 166 which allows air to enter thru the mouth 168 and leave thru the nose 170. The circumference of the air line at the exit valve 166 is somewhat restricted and the valve member itself is capable of vibration so that a sound, more-or-less simulating a cough or wheeze, is produced upon each exhalation. Thus a child can both feel the "breath" going into and out of the doll, and can also hear the "breathing." In addition, the area immediately surrounding the mouth 168 of the doll is formed of a short cylinder or tube 172 of compressible material adapted to engage and retain a cigarette 174 or conventional clinical thermometer bulb (not shown). With a glowing cigarette thus inserted (or lighted after insertion), smoke is inhaled thru the buccal line 160 into the lungs 152 and exhaled thru the nasal tube 162 upon each respiratory cycle produced by the lung bellows 42. At the rear of the mouth cavity 172 there is wound a coil of high resistance wire 176 connected to the dry cell 14a or analogous energy source and designed to produce a temperature akin to body heat (98.6° F.) so that by insertion of a fever thermometer into the socket thus provided, a child can "take the temperature of the patient." Electric circuit thru the coil 176 is completed by a switch 177 actuated by pressure or weight of the inserted thermometer. By means of a rheostat 81 (or by selection of wire of the required resistance), the temperature produced for such measurement can of course be varied from the normal body temperature to indicate that the patient has a chill or fever as the case may be. Also, in the absence of an external air line, the vibrating element 166 can be located in an internal air line such as 38 to provide a breathing sound.

FIGURE 11 illustrates a modification whereby the pulsating lung 180 simultaneously oscillates an overlying, elastic center 182 of a chest cover by direct contact therewith, so that the respiration is externally visible without removing the chest plate or looking thru it, the removable chest plate in this case being provided with a generally rigid frame 184 for attachment to the model.

The doll 10 is provided with self-opening and closing eyes 190 which are generally spherical, at least as to the forward curvature or external surface thereof, and partially rotatable or vertically oscillatable within a retaining socket 192. Each eye carries a dependent weight 194 which acts like a pendulum bob in positioning the eye so that (by the action of gravity) the eye is "open" when the torso is upright, and "closed" when the doll reclines. An electric lamp 196 is mounted in each eye, behind a transparent lens or window 198 (corresponding to the iris), being connected to the battery 14 by electric wires 200 inserted thru a dependent stem or tube 202 which hangs down back of the eye within the head. One (or both) of the doll's hands 204 contains a compressible fluid chamber 206 which is connected by a fluid line 208 to the fixed bellows 210 in the head. The opposite extensible end of the bellows supports an axially projecting shaft 212 having a forked end 214 disposed to embrace the pair of dependent eye-tubes 202. When the doll is in a reclining position (the eyes being closed) as seen in FIGURE 12, compression of the flexible hand 204 and internal fluid chamber 206 causes the head bellows 210 to expand, and by means of the cross arm 214 pushing the hanging tubes 202, revolves the eyes 190 to "open position." At the same time, outward movement of the bellows past an electric switch 216 closes a circuit thru the eye lamps 196, causing the opening eyes to light up. When pressure on the hand 204 is released by the operator, the head bellows 210 contracts, the eyes close by gravity and the lights therein go out. Provision is also made, by means of the fluid line 218, for the lung bellows 42 to operate the head bellows so that with such connection (the doll reclining) the eyes open and light up upon each inhalation or expansion of the lungs 36 produced by the motor-operated lung bellows 42.

When the doll (or torso is positioned upright, with the eyes consequently open, the same compression and release of the hand chamber 206 causes one eye only of the doll to wink. This is effected by a permanent magnet 220 carried by the cross bar 214 in position to attract a single one of the eye tubes 202. Accordingly, when the bellows 210 is extended toward the pair of eye tubes 202 hanging vertically (in line with the longitudinal axis of the doll) in "open" position, the magnet 220 attracts or attaches to one metallic tube 202. When the bellows 210 then contracts (upon release of pressure on the hand 204), the returning cross arm 214 and magnet 220 draw back the magnetically attached tube 202 and thus swing the corresponding eye to "closed" position. However, a stop pin or detent 222 blocks further retraction of the eye tube 202 prior to complete contraction of the bellows 210 so that the cross arm 214 and magnet 220 being further retracted beyond the range of magnetic attraction, the captive tube 202 is released to swing forward and restore the eye to "open" position, thus completing the "wink." Accordingly it will be seen that the same compression of the hand 204 produces two different and essentially opposite results in opening or closing one or both eyes, depending upon whether the doll is initially in an upright or reclining position. Thus its posture automatically alters the response obtained from a hand squeeze.

While the several bellows and connected fluid lines have been designated as air filled from time to time, because this is generally the most readily available fluid and like most other gases is both non-toxic and compressible, it is to be understood that other gases may be substituted in whole or part, and also such fluid may consist of liquids such as water if desired. It will be apparent to those skilled in the art that a considerable choice of material for the inflatable fluid chambers is currently available, of which particular mention may be made of plastic fabric now used in aqua lungs and skin diving suits.

I claim:

1. In a model of the character described, the improvement comprising in combination therewith: a pair of flexible surfaces simulating different normally pulsating organic tissues, internal inanimate means for rhythmically flexing said individual surfaces each at a different rate, timing means for correlating the two rhythms to approximate natural physiological pulsations of the respective organic tissues represented, and at least one externally curved element representing an eye and disposed for free rotation between "open" and "closed" positions, said element being weighted so as automatically to rotate to "closed" position upon the model being horizontally disposed, and operative means responsive to flexing of one of said surfaces for intermittently rotating the eye to "open" position upon each pulsation of said surface while the model remains generally horizontal.

2. A model of the character described, comprising in combination: a pair of flexible surfaces simulating lung and heart organs respectively, operative means for flexing said individual surfaces at an approximate 1 to 4 ratio simulating natural physiological pulsation thereof, a secondary flexible surface pulsatable by said means simultaneous with said flexible heart surface and located on the model for tactile measurement of the pulsation rate thereof, sound-emitting means adapted to emit physiologically simulated heart and respiratory sounds correlated with said heart and lung pulsations, and an outwardly retractable, transparent chest plate disposed to expose tactilly said flexible lung and heart surface upon retraction, said model carrying a switch element responsive to retraction of said chest plate for starting said operative means.

3. The model of the preceding claim 1 wherein said flexing means are electrically operated and which model includes a pair of eyes having an electric light disposed to shine therethru to the exterior, and switch means responsive to operation of said flexing means adapted intermittently to activate said light upon each inhalation-exhalation cycle.

4. A handable doll of the character described adapted to simulate a plurality of physiological manifestations and comprising in combination: an internal motor including a rotary drive shaft; a self-contained energy source for operating said motor; a pair of externally visible, flexible surfaces disposed on fluid chambers, and intermediate linkages functionally connecting each of said surfaces with said drive shaft for rhythmic pulsation at different rates corresponding to pulsation of heart and lungs respectively; at least two secondary flexible surfaces simulating a pleural diaphragm and dermal artery respectively and adapted to pulsate in unison with the lungs and heart respectively, said dermal artery surface being disposed for tactile measurement of pulsation by an observer; a pair of externally curved surfaces representing eyes, each mounted in a socket for free, limited oscillation between "open" and "closed" positions, the eyes being weighted for normal gravitational disposition in the "open" position when the doll is upright and in the "closed" position when the doll reclines; an electric light disposed to shine from within each eye to the exterior when the eyes are open; switch and circuit means for intermittently activating said light from an internal energy source and for opening said eyes upon each pulsation of said lung surface when the doll is reclining; a mouth socket adapted yieldingly to retain alternately a cigarette and a thermometer therein, and conduit means for inhaling and exhaling external air and smoke from the mouth into the lung chamber synchronously with the pulsation thereof; and a heating element disposed adjacent said socket and activated by a pressure-responsive switch and thus adapted selectively to produce a physiologically simulated body temperature registrable by a thermometer in response to insertion of the latter in said socket.

References Cited in the file of this patent

UNITED STATES PATENTS

| | | | |
|---|---|---|---|
| 1,143,458 | Stern | June 15, | 1915 |
| 1,174,007 | Heeger | Feb. 29, | 1916 |
| 1,279,831 | Berger | Sept. 24, | 1918 |
| 1,572,409 | Oldham | Feb. 9, | 1926 |
| 1,633,313 | Carter et al. | June 21, | 1927 |
| 1,763,467 | Klinker | June 10, | 1930 |
| 1,937,397 | Averill | Nov. 28, | 1933 |
| 2,065,473 | Liwschutz | Dec. 22, | 1936 |
| 2,098,166 | Rubenstein | Nov. 2, | 1937 |
| 2,154,121 | Bold | Apr. 11, | 1939 |
| 2,310,037 | Reno | Feb. 2, | 1943 |
| 2,616,216 | Fraysur | Nov. 4, | 1952 |
| 2,774,184 | Hefferan et al. | Dec. 18, | 1956 |
| 2,803,089 | Crompton | Aug. 20, | 1957 |
| 2,940,755 | Pouder | June 14, | 1960 |
| 2,954,639 | Walss | Oct. 4, | 1960 |
| 2,954,642 | Jackson | Oct. 4, | 1960 |
| 2,979,859 | Lossev | Apr. 18, | 1961 |
| 3,024,568 | Barnett | Mar. 13, | 1962 |

OTHER REFERENCES

Science News Letter for July 19, 1958, page 47 cited.